United States Patent [19]
Blakeslee et al.

[11] Patent Number: 5,365,149
[45] Date of Patent: Nov. 15, 1994

[54] APPARATUS AND METHOD FOR PRODUCING A FREQUENCY BASED VISUAL EFFECT

[76] Inventors: Robert Blakeslee, 11005 "Y" St., Omaha, Nebr. 68137; Thad Kulik, 8550 Underwood Ave., Omaha, Nebr. 68114

[21] Appl. No.: 48,452

[22] Filed: Apr. 8, 1993

[51] Int. Cl.⁵ ............................................. H05B 37/00
[52] U.S. Cl. ..................... 315/200 A; 315/209 R; 315/307; 315/308; 340/815.67; 340/815.46
[58] Field of Search ............... 315/200 A, 209 R, 307, 315/308; 340/815.11, 815.01, 815.1

[56] References Cited
U.S. PATENT DOCUMENTS

| | | | |
|---|---|---|---|
| 1,654,068 | 12/1927 | Blattner | 84/464 R |
| 1,690,279 | 11/1928 | Craft | 84/464 R |
| 3,062,085 | 11/1962 | Smith | 84/464 |
| 3,478,637 | 11/1969 | Reed et al. | 84/464 |
| 3,838,417 | 9/1974 | Charas | 340/366 |
| 4,156,166 | 5/1979 | Shapiro et al. | 315/200 A |
| 4,206,495 | 6/1980 | McCaslin | 362/32 |
| 4,305,117 | 12/1981 | Evans | 362/96 |
| 4,358,754 | 11/1982 | Young et al. | 340/815 |
| 4,440,059 | 4/1984 | Hunter | 84/464 |
| 4,934,633 | 6/1990 | Ballingor et al. | 315/200 A X |
| 5,023,517 | 6/1991 | Husak | 315/200 A |

*Primary Examiner*—Robert J. Pascal
*Assistant Examiner*—Reginald A. Ratliff
*Attorney, Agent, or Firm*—John A. Beehner

[57] ABSTRACT

A variable lighting apparatus for visually simulating and translating the frequencies present in an input signal to a light, the characteristics of which may be varied in accordance to the properties of the input sound. The lighting apparatus may be fitted with a plurality of filter channels for filtering the input signal into preselected bands. Each channel may then drive an independent light, each of which may be differently colored and will respond individually to the frequency components of the input signal determined by the filtering channel to which it is attached. The frequency response band and sampling characteristics of each filter may be adjusted to provide for a variable visual effect.

13 Claims, 5 Drawing Sheets

APPARATUS AND METHOD FOR PRODUCING A FREQUENCY BASED VISUAL EFFECT

BACKGROUND OF THE INVENTION

1. Technical Field

The method and apparatus of the present invention relates generally to lighting effects. More specifically, it relates to an apparatus and method for producing a lighting effect which varies according to the components of the input signal. If the input signal is sound, the apparatus is capable of splitting the incoming sound signal into a plurality of frequency components and using each of these frequency components to generate a light control signal. The light control signal may then be used to vary the flashing or enabling period of an individual light. This provides a unique lighting effect which differs significantly from merely varying the light's intensity. The apparatus may be configured for use in either a home or commercial setting.

Currently, lighting effects are generally confined to producing a light which will flash independent of the amplitude of the input sound sensed and usually do not discriminate according to various frequency components in the signal. Additionally, lasers have recently begun to appear in lighting shows. However, lasers, although aesthetically pleasing, are somewhat dangerous to use in a crowded environment. Further, lasers depending on power and illumination source can be quite expensive to purchase.

2. Description of the Prior Art

Prior art devices coupling a variable lighting unit to a sound source are well known in the art. However, generally these prior art devices are limited to varying the light pulse frequency or amplitude independent of the amplitude of the input sound signal. Even simpler devices provide for a strobe light which flashes at a predetermined frequency independent of the input sound signal.

An example of this type of prior art is illustrated in Charas U.S. Pat. No. 3,838,417. The Charas invention discloses a flashing strobe light which flashes at an operator-selected predetermined frequency. The flash frequency is independent of the audio signal. The invention also discloses a means for flashing a plurality of colored lights wherein the color flashed is dependent on the flashing frequency. However, as is typical of many prior art devices, no provision is made for directly associating the frequency of flashing or the color of light being illuminated to the input sound signal.

An example of a more sophisticated prior art device is Blattner U.S. Pat. No. 1,654,068 which discloses an apparatus for visually interpreting speech and music. Blattner discloses a device which may be attached to a music source by means of a filter system which separates the sound signal from the source into three distinct bands. The outputs from these three filter bands are used to drive three lamps which may be of different colors. The intensity of the light assigned to a given frequency band is determined by the intensity of the input sound signal at that frequency. However, there is no means provided for flashing or enabling the colored lights at a frequency corresponding to the amplitude of the signal at a given filter frequency band. The visual effect presented by Blattner by varying the intensity of the lights is completely different from that provided by flashing or strobing a light off and on.

None of these prior art lighting systems teach the unique visual effect of the present invention whereby an input signal may be separated according to some predetermined characteristics such as frequency and wherein these characteristics can be used to drive a flashing light apparatus.

Consequently, it is a primary objective of the present invention to provide an apparatus which is capable of receiving an input signal, separating the input signal into a plurality of frequency bands, and assigning each frequency band output to a specified colored light. The colored light in that frequency band may then flash during an enabling period which is proportional to the amplitude of the output of the signal in that frequency band providing a unique visual effect.

Another objective of the present invention is to provide a lighting apparatus which may control the flash rate of the light in proportion to the amplitude of the signal in an associated frequency channel.

A further objective of the present invention is to provide a variable light apparatus which is capable of driving conventional illumination means.

An additional objective of the present invention is to provide a variable light apparatus which is capable of receiving a sound signal either by direct electrical coupling of the lighting apparatus to the sound source or by means of an acoustical coupling to the sound source such as through a microphone.

A further objective is to provide a lighting apparatus wherein the lighting colors assigned to a frequency filter band may be adjusted.

An additional objective of the invention is to provide an apparatus which is capable of adjusting the sampling rate cf the input sound signal such that the precision with which the lighting apparatus tracks the incoming signal may be adjusted.

A further objective is to provide an apparatus which is adaptable for use in either a home or commercial setting.

A final objective of the invention is to provide a means for adjusting the conversion factor between the amplitude of the frequency component and the flash frequency or enabling period of the associated light.

SUMMARY OF THE INVENTION

The variable lighting apparatus of the present invention provides a means for visually simulating and translating the frequencies present in an input signal to a light, the display characteristics of which may be varied in accordance to the properties of the input signal. The lighting apparatus of the present invention includes an input means for electrically inputting a signal to be simulated. A gain control means may be electrically connected to the input means and provides an adjustment of the amplitude of the input. A plurality of means may be electrically connected to the gain control means and selectively filter frequencies from the input signal. A sampling means is electrically connected to the filtering means obtaining a sample of said input sound. The sampled signal is to a converter means for converting the filtered sample of the sound input into a variable frequency output, the frequency of which varies in proportion to amplitude of the filtered sample of the input. A pulsing means is connected to the converter generating a sequence of flashing pulses, the frequency of which determined by the output of the converter means. Finally, a light means is electrically connected to the pulsing means whereby the light is flashed in response to the variable output frequency of the converter means corresponding to the amplitude of the input that frequency band.

The method of the present invention includes providing a lighting apparatus capable of selectively separating an signal into desired frequency components and converting the amplitude of the input signal in that frequency band into a flash rate which is proportional to the amplitude of the signal in that band. The method further provides for adjusting the sampling rate of the apparatus such that the precision with which the apparatus follows changes in the input signal amplitude may be altered. Finally, the method allows the flash rate as a function of signal amplitude to be adjusted.

DESCRIPTION OF THE PREFERRED EMBODIMENT

1. Theory of Operation

The theory of operation of the present invention may be summarized as follows. An input signal comprising sound or other periodically varying signal is input to the apparatus. The input signal may be coupled to the apparatus by direct electrical connection or the coupling may be effected indirectly through a microphone or other transducer. The signal may then be amplified as desired. The frequency components of the input signal are then segregated into a plurality of frequency channels (preferably three although a single filtered/channel may be used) using conventional filters. A sample and hold circuit then periodically samples the amplitude of the signal present in each of the filtered channels. The sampled amplitude of the signal is then used to drive a variable period clock, the period of which is proportional to the amplitude of the signal present in the filter channel. This period, referred to as the enabling period, then controls the flashing period of a respective strobe light. The flashing frequency during the enabling period is set by the operator. In one embodiment the flash frequency of the light would be considerably higher than the amplitude driven enabling period. In that case the light will flash numerous times during the enabling period. Alternatively, the flash rate of the light may be adjusted to be relatively slower than the enabling period and therefore the flashing of the light may be tied more directly to the enabling period and thus the amplitude of the filtered signal.

2. Preferred Hardware Design

Figure 1:
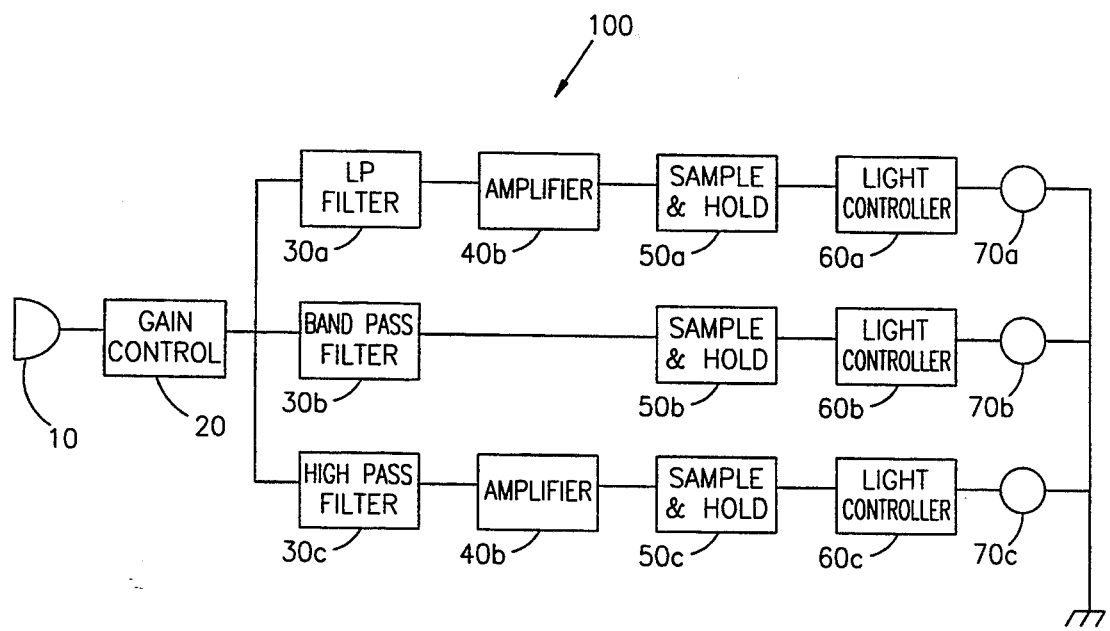
FIG. 1 is a block diagram showing major components of the light apparatus of the present invention in a three filtered channel configuration.

FIG. 1 shows a block diagram comprising the major components of the invention 100. As seen in the figure, an input microphone 10 is used to acoustically couple a sound source to the light control apparatus 100. Provisions in the preferred circuitry also allow for the direct electrical coupling of a sound source to the lighting apparatus 100 without the need for an acoustical coupling device such as microphone 10. Additionally, the input signal is not restricted to sound but may be any variable signal such as pressure, temperature or the like. Either directly from the source, or through acoustic coupling device 10, the input signal is then fed to a voltage gain control 20. Gain control 20 conditions the amplitude of the input signal to be compatible with the remaining circuitry. Gain control 20 is entirely optional, its use being determined by strength. After conditioning by optional gain control 20, the signal is then fed to three parallel, band filters 30a–c. In the preferred embodiment, the input signal is separated into three components but obviously more may be used to create a different effect. Alternatively, in some situations, a single channel may also produce desired effect. In that case the apparatus would operate by passing only a single band of frequencies.

As is well understood in the art, filters 30a–c are constructed to pass a certain band of frequencies depending on the design parameters of each filter. For example, in the preferred embodiment, filter 30a is a low-pass filter which passes signal frequencies between approximately 20 and 400 Hz, filter 30b is a mid-band pass filter which passes frequencies from approximately 400 to 1,500 Hz, and filter 30c is a high-pass filter which passes frequencies between approximately 1,500 and 20,000 Hz. High pass and low pass channels may also have additional amplifiers 40b and 40a respectively to provide additional amplification of the filtered signal.

After filtering and amplification, the input signal is passed to sample and hold circuitry 50a–c. Sample and hold circuitry 50a–c is operative to sample the analog signal output from amplifiers 40a and 40b and filter 30b and present a DC output proportional to the analog input during the sample period. The sample and hold time periods for sample and hold circuitry 50a–c are determined by the component values used in the circuitry discussed more specifically below. The frequency of the sample and hold function affects the precision with which the output of the sampler tracks the changing amplitude of the input signal. For example, if the amplitude of the input signal is changing rapidly, the sampling rate (frequency) must also be higher in order to accurately represent the sampled signal.

After the filtered input signal has been sampled by sampling means 50a–c, the sampled signal is fed to light controller means 60a–c. Light controller means 60a–c is operative to convert the DC voltage output from sampling circuitry 50a–c into a variable frequency square wave, the frequency of which varies in direct proportion to the DC voltage output from sampling circuitry 50a–c. This variable frequency square wave defines the enabling period. The variable frequency square wave from light controller means 60a–c is then fed to lights 70a–c. In the preferred embodiment, lights 70a–c would be different colors to enhance the visual light effect. Light controller means 60a–c is operative to control the flash period of light means 70a–c. The square enabling pulse from light controller means 60a–c enables lights 70a–c. Thus, this enabling pulse determines the period during which light means 70a–c will strobe at the preset frequency. The strobing frequency of the lights 70a–c during the enabling period is determined by additional circuitry described below and may be adjusted by the operator. Thus, light means 70a–c is strobed at a preselected frequency for a period of time representative of the amplitude of the signal in each respective filter channel. As mentioned above, suitable adjustment of the preset light strobing frequency relative to the enabling period will effectively cause the flashing frequency of the light to be determined by the amplitude of the filtered signal.

Figure 2:
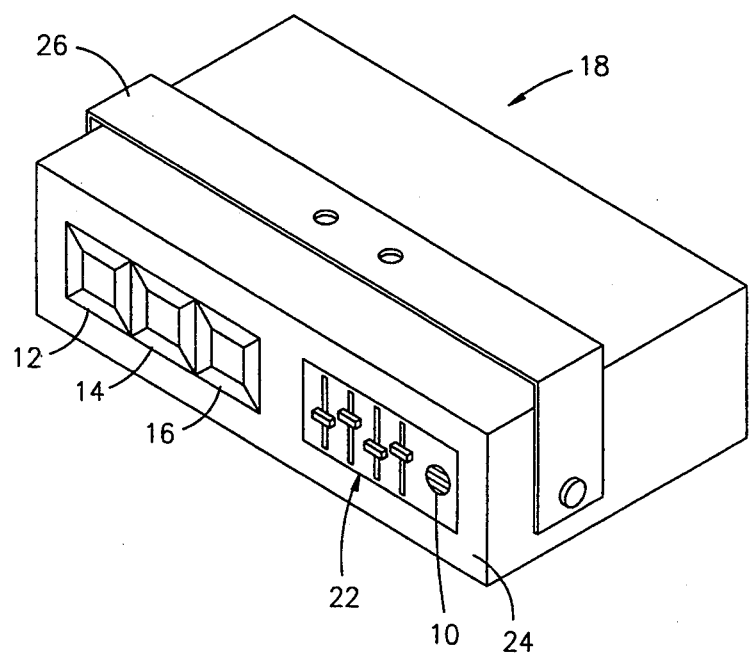
FIG. 2 is a front elevational view showing the exterior of a mounting cabinet for portable mounting of the lighting apparatus in a commercial setting, showing the three colored lights and the means for adjusting the various input parameters of the apparatus.

FIG. 2 is a front elevational view showing the apparatus of the present invention enclosed in case 18. The embodiment shown in FIG. 2 would be used in a commercial setting. In that situation, case 18 may be secured by means of bracket 26, to the ceiling or some remotely controllable fixture. The embodiment shown in FIG. 2 would be that used in a commercial setting. As seen in the figure, the lighting apparatus of the present invention fits compactly in a relatively small and transportable case 18. As shown in the figure in the preferred embodiment, strobe lights 12, 14 and 16 are installed on the front panel 24 of case 18 and may be pointed in any direction to accommodate the physical layout of the room in which the lighting apparatus is placed. Also shown in the figure, are controls 22. Controls 22 are used to adjust various parameters of the lighting apparatus such as the sample and hold rate or flashing frequency of the lights. Finally, FIG. 2 shows a microphone 10 installed in the front panel of case 18. As described above, microphone be may be used for acoustic coupling of an input signal into the present lighting apparatus.

Figure 6:
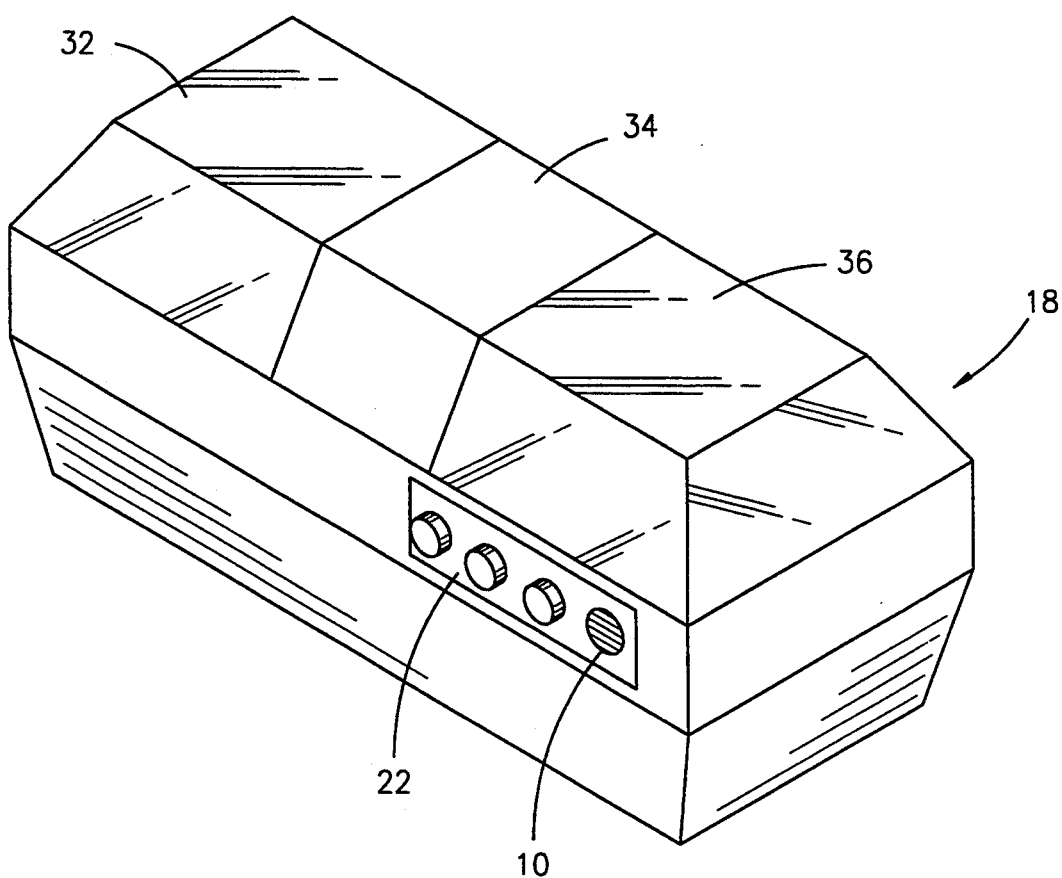
FIG. 6 is a front elevational view showing the exterior of a portable mounting cabinet for the lighting apparatus in a home use configuration.

FIG. 6 demonstrates an additional means of mounting the lighting apparatus in a case 18. In the embodiment shown in FIG. 6, it is anticipated that the apparatus would be used at a home setting. As shown in the figure colored lights 32, 34 and 36 may be mounted on the top of case 18. Controls 22 may be secured to the front of case 18 as shown. As discussed above, these controls would be used to vary control parameters in the lighting unit. In the embodiment shown in FIG. 6, it is desirable that the unit be constructed of a size to allow its placement atop a table, speaker or the like.

Figure 3:
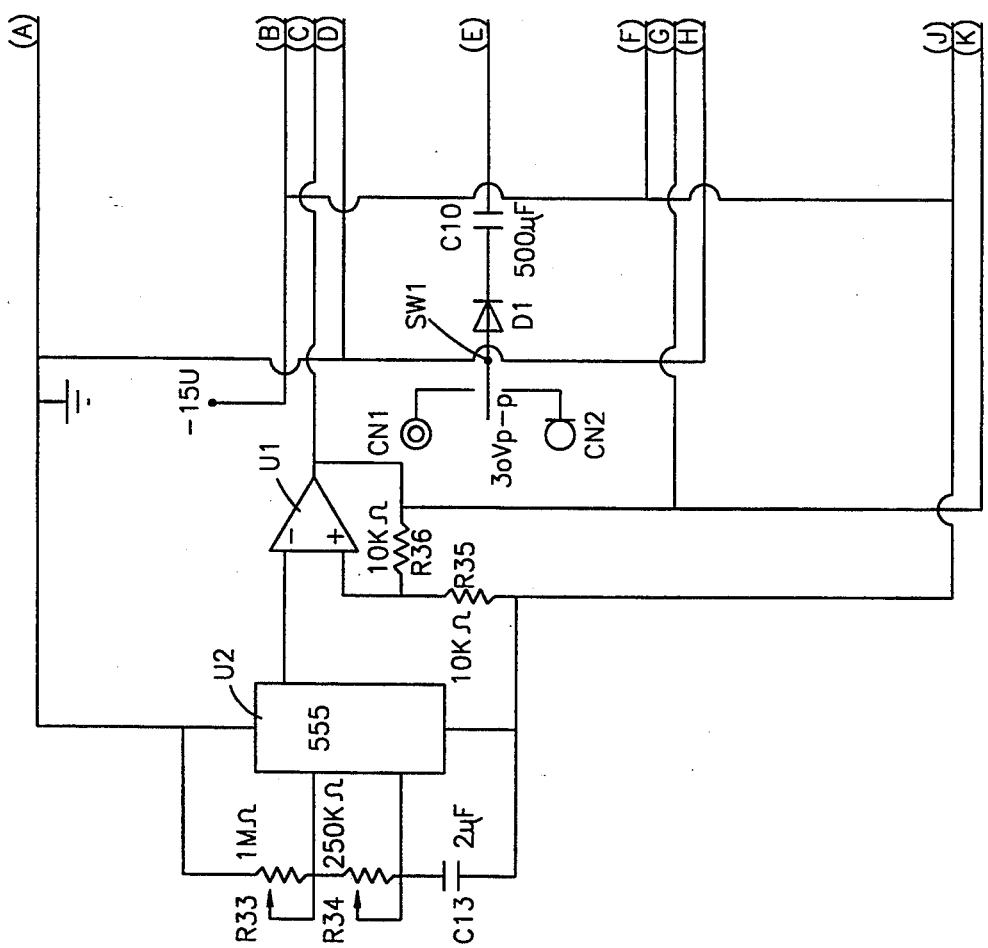
FIGS. 3, 4 and 5 are electrical schematic diagrams of the preferred embodiment of the invention showing the three filter channels.
Figure 4:
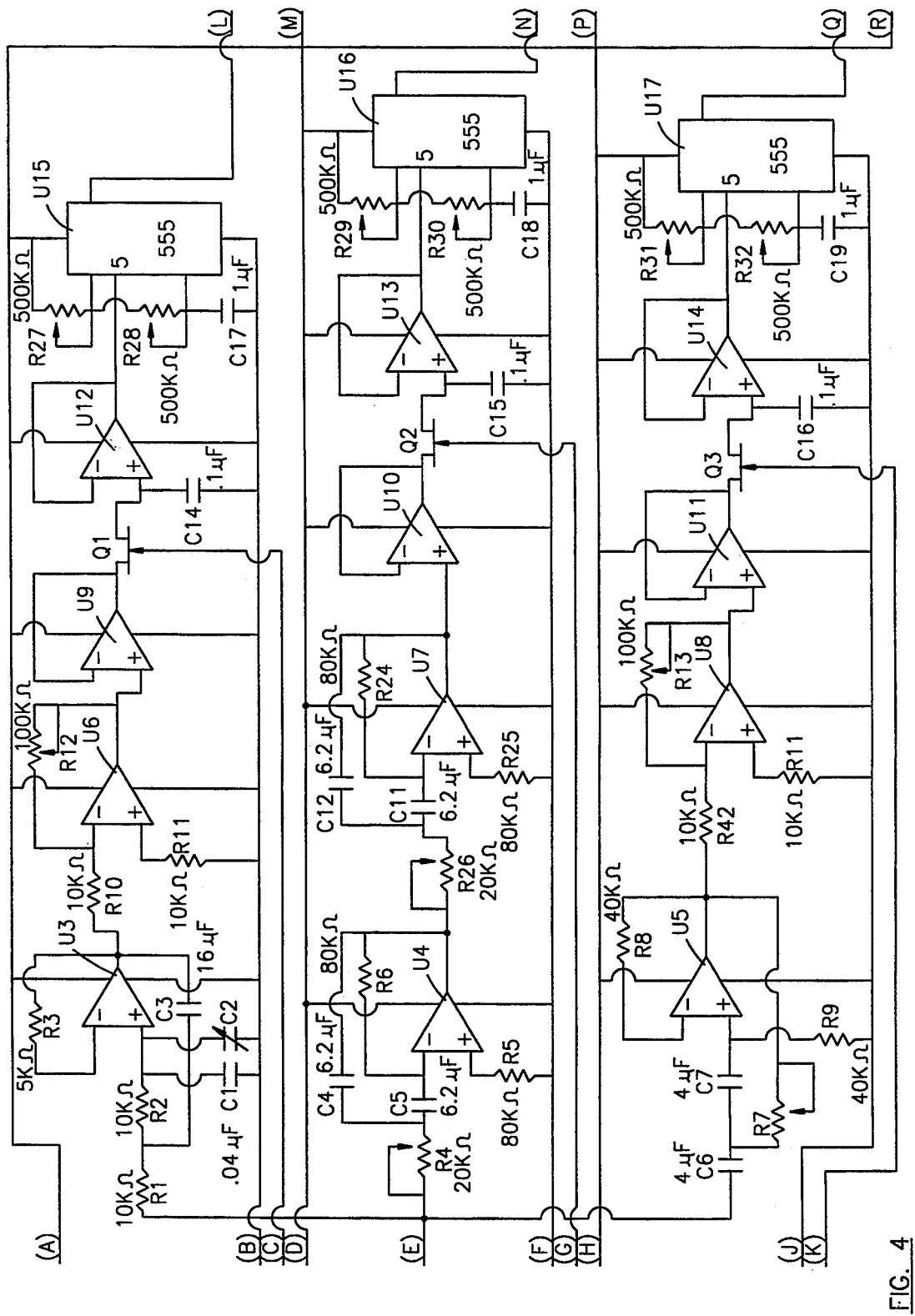
Figure 5:
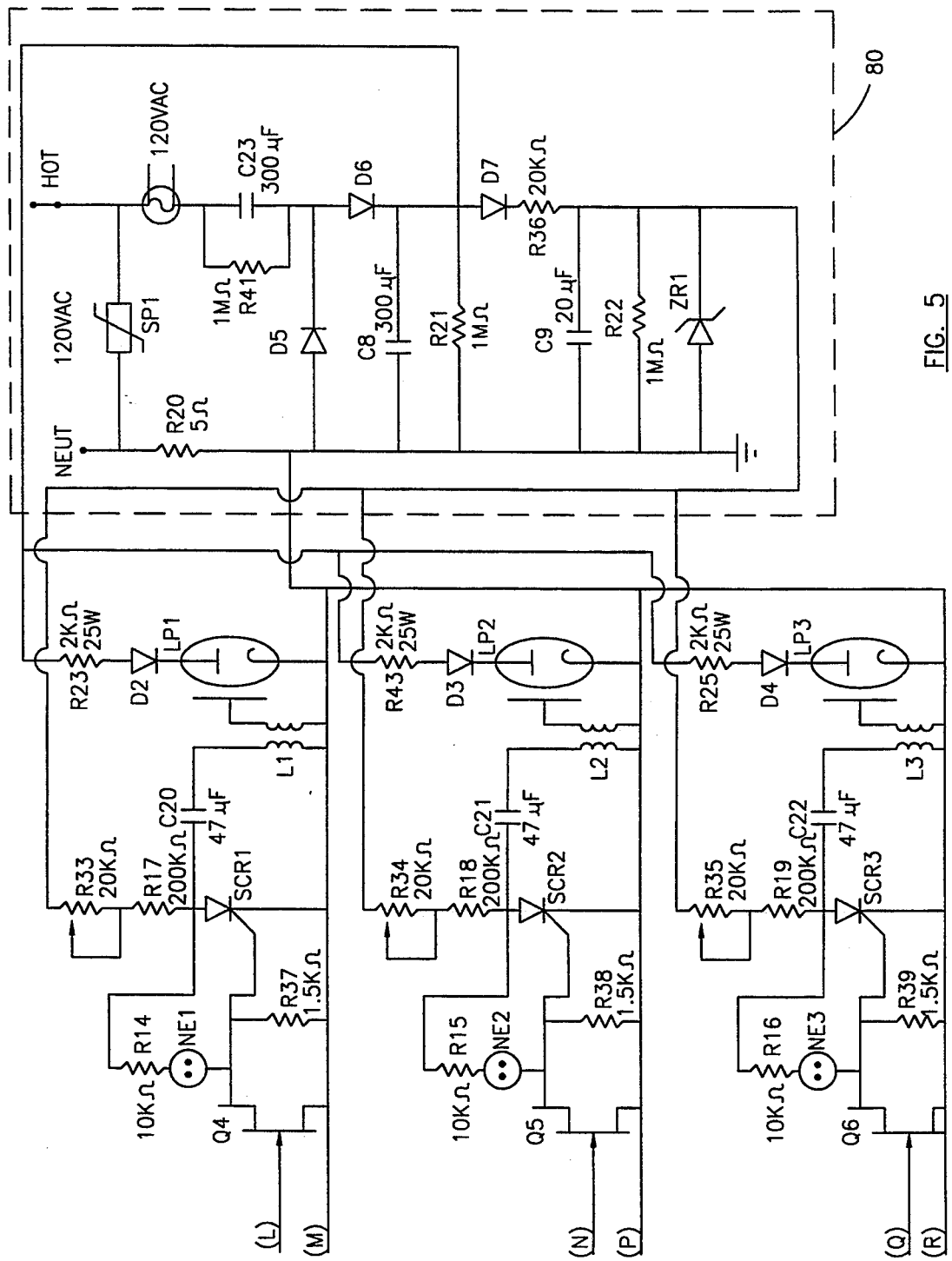

FIGS. 3, 4, and 5 are detailed electrical schematic diagrams of the lighting apparatus of the present invention. In the preferred embodiment, and as shown in the figures, the lighting control apparatus comprises three filter channels. In each of the three channels, the functioning of the components is similar except for the frequencies which are passed in that channel.

As shown in the FIG. 3, the signal source may be connected to the lighting apparatus by either of two methods. In the first instance, if the input signal is sound, it may be acoustically coupled to the lighting apparatus by means of connector CN2, which may connect to a microphone 10 (not shown) or other acoustically sensitive transducer. Alternatively, an input signal may be directly connected, electrically by means of connecter CN1. Choice between the input methods may be made by means of switch SW1. The input-signal then travels through diode D1 and capacitor C10 into parallel filter means comprising Op-Amps U3, U4, U5 and U7 shown in FIG. 4. Diode D1 and capacitor C10 serve to AC couple the input signal to the circuit thereby preventing any DC noise from reaching the circuit and guarding against transients.

In the preferred embodiment, it is anticipated that the input signal would have a magnitude of approximately 30 v p—p. In that situation, no "pre-amplification" of the signal prior to filtering is needed. In the event that the input signal is weaker, a "preamplifier" consisting essentially of a broad bandwidth Op-Amp, may be inserted directly after capacitor C10.

As explained earlier, Op-Amps U3, U4, U5 and U7 comprise a parallel filter network, operative to selectively pass frequency components within the operating range of each individual Op-Amp. In the preferred embodiment, Op-Amps U3, U4, U5 and U7 are 741 Op-Amps but may be any of a large number of linear amplifiers. As is well understood in the art, the operating range of each Op-Amp is determined by the external resistor and capacitor components. Op-Amp U3 comprises the low-pass filter which is operative to pass frequency components in the 20 to 400 Hz range. The frequency response characteristics of this Op-Amp are determined by resistors R1, R2 and R3 in conjunction with the capacitors C1, C3 and variable capacitor C2. With the resistor and capacitor values as indicated in the schematic figure, Op-Amp U3 will pass frequencies in the 20 to 400 Hz range.

Op-Amps U4 and U7 are configured to be a fourth-order, mid-band pass filter. The pass frequencies for Op-Amp U4 and U7 are determined by resistors R4–R6 and R24–R26 in conjunction with capacitors C4, C5 and C11, C12. With the values shown in the figure, the frequency range of 400 Hz to 1,500 Hz is passed by the filter. Finally, Op-Amp U5 comprises the high-pass filter. With the values shown for R7, R8 and R9 in conjunction with C6 and C7, the filter will pass frequencies approximately 1,500 to 20,000 Hz.

After filtering, the high pass and low pass signals are further amplified by means of Op-Amps US and U6 respectively. These Op-Amps, in conjunction with their associated resistors, serve to further amplify the signals in the high and low pass bands. No additional filtering is done by the Op-Amps so the frequency characteristics of the signal remain the same.

After filtering and amplification, the signals in all three frequency bands are next passed to the sample and hold circuits comprised of Op-Amps U1, and U9–U14 in conjunction with timer U2, and transistor switches Q1, Q2, and Q3. These three sample and hold circuits are operative to sample the analog output of the filter-/amplifier circuits and provide a constant DC output over the holding period. As explained above and as is well understood in the art, the sample and hold period affects the circuit's ability to track the changing amplitude of the input signal. As previously mentioned, for a rapidly changing amplitude the sample rate must be correspondingly higher faster to accurately represent the signal.

The sample and hold periods are determined by timer U2, capacitor C13 and variable resistors R33 and R34. In the preferred embodiment these controls are not user-adjustable but are set in the manufacturing process to give a sample and hold period which is sufficient to follow rapidly changing amplitudes in the input signal. The individual valves of R33, R34, and C13 can be varied greatly. As is well understood in the art, R33 and R34 determine the duty cycle of the U2 output while R33, R34 in conjunction with C13 determine the total period of the U2 output pulse. In the preferred embodiment, R33, R34 were adjusted to give a duty cycle of approximately 10%. The timing pulses from U2 are then inverted conventionally using Op-Amp U1 functioning as a Schmidt trigger. The individual valves of R35/R36 are to be equal. The inverted timing signal is then sent to sampling control switches Q1–Q3. Sampling control switches Q1–Q3 are N-channel JFET transistors configured to operate as ON/OFF switches. When transistors Q1–Q3 are "ON", buffered signals from unity gain buffers U9–U11 are allowed to flow through the transistors thereby charging capacitors C14–C16. The values to which the individual capacitors C14–C16 charge is representative of the amplitude of the sampled signal in that respective frequency band during the sampling period. This amplitude value is then transmitted to timers U15–U17 through buffers U12–U14. Buffers U9–U14 are preferably FET input Op-Amps configured as emitter-follower amplifiers of unity gain. Once the signal in each channel is sampled, it is converted into a square wave pulse train by timers U15–U17. The timing characteristics of this square wave define the enabling period of the flashing lights.

Timers U15–U17 translate the sampled voltage from C14–C16 through buffers U12–U14 into square wave, enabling pulses, the periods of which vary in proportion to the input sampled voltage. As is well understood in the art, the range over which this period varies individually in each filter channel is determined by resistors R27–R32 and capacitors C17–C19. In the preferred embodiment, the range of variation of the enabling pulse period is approximately 0 to 1 seconds depending on the amplitude of the sampled signal. The square wave enabling pulses from U15–U17 are transmitted to PNP transistors Q4–Q6 which in turn control the flashing of lamps L1–L3.

Transistors Q4–Q6 function as switches to control the flashing of lamps L1–L3. When Q4–Q6 are switched "ON" by timers U15–U17, silicon controlled rectifiers SCR1–SCR3 are turned "OFF" and do not conduct. When transistor switches Q4–Q6 are switched "OFF", SCR1–SCR3 are allowed to conduct. Thus, the switching of SCR1–SCR3 serves an "enabling" function and controls the period during which lamps L1–L3 flash at their predetermined rate.

The rate at which lamps L1–L3 flash is determined by the values of resistors R33–R35 and capacitors C20–C22. In the preferred embodiment with the values shown the lights will flash at a rate of approximately 10 Hz. This rate may be adjusted by changing the values of the resistors and capacitors. It has been found that the flash rate must be less than 18 Hz to allow ON-OFF transitions to be appreciated.

As mentioned above, the enabling periods are determined by the values of the external resistors and capacitors on timer circuits U15, U16 and U17 in conjunction with the input signal amplitude. For example, in the mid-band pass filter channel, resistors R29 and R30 in conjunction with C18 determine the enabling periods for timer U16. In the preferred embodiment, timer circuits U15, and U17 give an enabling flash period of approximately 0 to 1 seconds.

The voltage doubler 80 delivers a dc voltage of 340 volts to 3 parallel connected xenon lights LP1, LP2, and LP3 whose required anode-cathode voltage is 300–400 v (such as Tec-West models).

An alternative to the doubler would be a 2-output transformer (one step-up and one step-down), and appropriate rectifiers.

Identical triggering configurations consist of identical trigger coils L1, L2, and L3 delivering negative voltage spikes of −6 Kv/0.4 watt at the trigger electrodes; and of identical capacitors C20, C21, C22 delivering standard spikes of approximately −200 v to coils primary side.

The 3 SCRs SCR1, SCR2, SCR3 deliver the above voltage spikes when fired. The firing occurs automatically when the neon lamps NE1, NE2, NE3 are charged to the firing voltage. After firing, the SCRs recover automatically with time constant determined, respectively, by resistors R33–R35 and capacitors C20, C21, C22. The frequency of the SCR firing and, thus, that of tube flashing can be adjusted with the help of variable resistors R33–R35. At a flash frequency of 25 Hz, the lights only flicker slightly.

The bipolar or FET transistors Q4, Q5, Q6, when turned on, disable the SCRs by putting the gates at ground potential, and, when turned off, enable the SCRs. The time interval during which the SCRs are enabled is adjustable from 0.1 to 1 sec., using timers U15–U17 described below.

Another option for firing the SCRs is to eliminate the neon lamps and deliver the voltage spikes directly to the gates of SCRs and using other means to turn off the SCR. Additionally, the SCRs may be replaced with any switching device capable of operating as an "ON/OFF" switch.

The transistors Q4, Q5, Q6 are turned on and off by timers U15, U16, U17 with adjustable intervals of high and low levels. The frequency of the timers is adjusted by the output signals from the sample-and-hold circuits Q1, Q2 and Q3. When, during a time interval, the sample-and-hold output is below a certain adjustable level, the frequency of the timers drops to zero, disabling the SCRs and the tubes for that time interval.

As described above, each of these three circuits consists of 2 buffer amplifiers U9–U14, one n-JFET Q1–Q3, and one holding capacitor C14–C16. Other equipment, such as isolating resistances, droop compensating capacitors, reset FETS and limiting diodes and others are optional. As is well understood in the art, when an n-JFET is on, the input signal passes through to the capacitor thereby charging the capacitor. This is the sampling time. When the FET is off, the capacitor is practically isolated and retains its charge. This is the holding time. Optionally, the circuits can be used as peak detectors.

The ratio of sample time to holding time is controlled by clocking the FETS Q1–Q3 from the clock U2, the frequency and the duty cycle of which are adjustable by means of R33, R34, and C13.

Thus, lights L1, L2 and L3 flash at a preset frequency during the enabling period which is in direct proportion to the amplitude of the sampled input signal corresponding to the frequency band of the channel to which the light is connected. As mentioned above, if the flash frequency is suitably adjusted, relative to the enabling period, the flash rate of the light will be effectively determined by the amplitude of the sampled signal.

In the preferred embodiment, the lights L1–L3 are 4–10 watt, 250–400 V alarming lamps. Additionally, in the preferred embodiment, each of the lamps attached to each filter channel will be of a different color. Obviously the colors chosen are to be determined by individual preference and may be changed as desired. Still further it should be noted that although the description of the preferred embodiment has centered around use of the lighting apparatus in the context of visually representing different frequency components of a sound input, the same circuitry may be used in other contexts such as pressure, temperature or the like. Any analog signal may be converted to a variable frequency and used to drive the lighting apparatus of the present invention in the same manner as with the preferred sound input. Additionally, and as mentioned above, the number of frequency channels into which the input signal is separated may vary from one to many depending on the unique lighting effect desired. More importantly the implementation of the electric pulsing means may be altered to accommodate a different visual effect. For example, and as described above the sample-and-hold circuit could be used to control the flashing frequency of the light itself. In that embodiment, the flash rate of the light might be set to be proportional to the amplitude of the signal in that channel.

Therefore, it is to be understood that the above description is intended in no way to limit the scope of protection of the claims and is representative of only one of the several possible embodiments of the invention.

Thus there has been shown and described an invention which accomplishes at least all of the stated objectives.

We claim:

1. A variable lighting apparatus for visually simulating and translating the frequencies present in an input signal to a light, the characteristics of which may be varied in accordance to the properties of the input signal, the lighting apparatus comprising:

an input means for electrically inputting said signal to be simulated;

sampling means electrically connected to said input means for obtaining a sample of said input signal;

converter means for converting said sample of said signal input into a variable frequency output, the frequency of which varies in proportion to amplitude of said sample of said signal input;

electric pulsing means for generating a sequence of electric pulses the period of which is determined by the output of said converter means; and light means electrically connected to said pulsing means for pulsed illumination in response to said variable output frequency of said converter means whereby said light means is pulsed for a period proportional to said input signal amplitude.

2. The lighting apparatus of claim 1 further comprising a gain control means electrically connected to said input means for adjusting the amplitude of said input signal.

3. A variable lighting apparatus for visually simulating and translating the frequencies present in an input signal to a light, the characteristics of which may be varied in accordance to the properties of the input signal, the lighting apparatus comprising:

an input means for electrically inputting said signal to be simulated;

sampling means electrically connected to said input means for obtaining a sample of said input signal;

converter means for converting said sample of said signal input into a variable frequency output, the frequency of which varies in proportion to amplitude of said sample of said signal input;

electric pulsing means for generating a sequence of electric pulses the period of which is determined by the output of said converter means;

light means electrically connected to said pulsing means for pulsed illumination in response to said variable output frequency of said converter means;

gain control means electrically connected to said input means for adjusting the amplitude of said input signal; and filtering means electrically connected to said gain control means for selectively filtering frequencies from said input signal.

4. The lighting apparatus of claim 3 wherein said input means is adapted to be electrically connected to said input signal source.

5. The lighting apparatus of claim 3 wherein said input means comprises a microphone means for acoustically coupling said input signal source to said lighting apparatus.

6. The lighting apparatus of claim 3 wherein said filtering means comprises a plurality of filter means for separating said input signal into a plurality of frequency bands.

7. The lighting apparatus of claim 6 further comprising a plurality of sampling, converter, and light means operative to separate said input signal into a plurality of frequency bands and wherein said plurality of sampling, converter, and lighting means are operative to produce a proportional signal to each of said plurality of frequency bands from said input sound.

8. The lighting apparatus of claim 7 wherein said light means one comprises lights having a plurality of colors and wherein said colored lights is connected to one of said plurality of frequency bands such that sound having frequency components in one of said plurality of said frequency bands will cause said associated colored light to flash.

9. The lighting apparatus of claim 8 wherein said sampling, converter, and said light means operate cooperatively such that said light means flashes during a time period proportional to the output of said converter means.

10. A method of producing a unique visual effect by translating the frequencies present in an input signal comprising:

providing a lighting apparatus having:

an input means for electrically inputting said signal to be simulated;

sampling means electrically connected to said input means for obtaining a sample of said input signal;

converter means for converting said sample of said signal input into a variable frequency output, the frequency of which varies in proportion to amplitude of said sample of said signal input;

electric pulsing means for generating a sequence of electric pulses the frequency of which is determined by the output of said converter means; and light means electrically connected to said pulsing means for pulsed illumination in response to said variable output frequency of said converter means inputting said signal to said lighting apparatus;

sampling said input signal thereby obtaining a sampled signal the value of which is proportional to the amplitude of said input signal;

converting said sampled signal into an electric pulse the time width of which is proportional to said sampled signal amplitude; and pulsing said illumination means in proportion to said sampled signal amplitude.

11. The method of claim 10 including the step of adjusting the flash frequency of said illumination means.

12. A method of producing a unique visual effect by translating the frequencies present in an input signal comprising:

providing a lighting apparatus having;

an input means for electrically inputting said signal to be simulated;

sampling means electrically connected to said input means for obtaining a sample of said input signal;

converter means for converting said sample of said signal input into a variable frequency output, the frequency of which varies in proportion to amplitude of said sample of said signal input;

a filtering means for filtering said input signal into a plurality of frequency bands;

electric pulsing means for generating a sequence of electric pulses the frequency of which is determined by the output of said converter means; and light means electrically connected to said pulsing means for pulsed illumination in response to said variable output frequency of said converter means;

inputting said signal to said lighting apparatus;

filtering said input signal into a plurality of frequency bands;

sampling said input signal in each of said frequency bands thereby obtaining a sampled signal the value of which is proportional to the amplitude of said input signal;

pulsing said illumination means in proportion to said sampled signal amplitude.

13. The method of claim 12 including the step of adjusting the frequency response of said filtering means.

* * * * *